Dec. 1, 1931.  A. H. LEAMY  1,834,164
AUTOMOBILE CONSTRUCTION
Filed Oct. 30, 1929  2 Sheets-Sheet 2
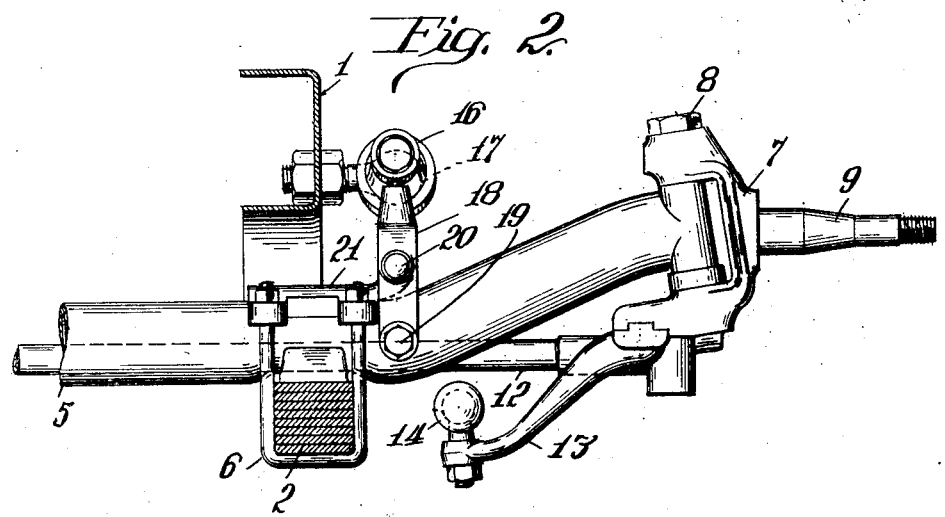
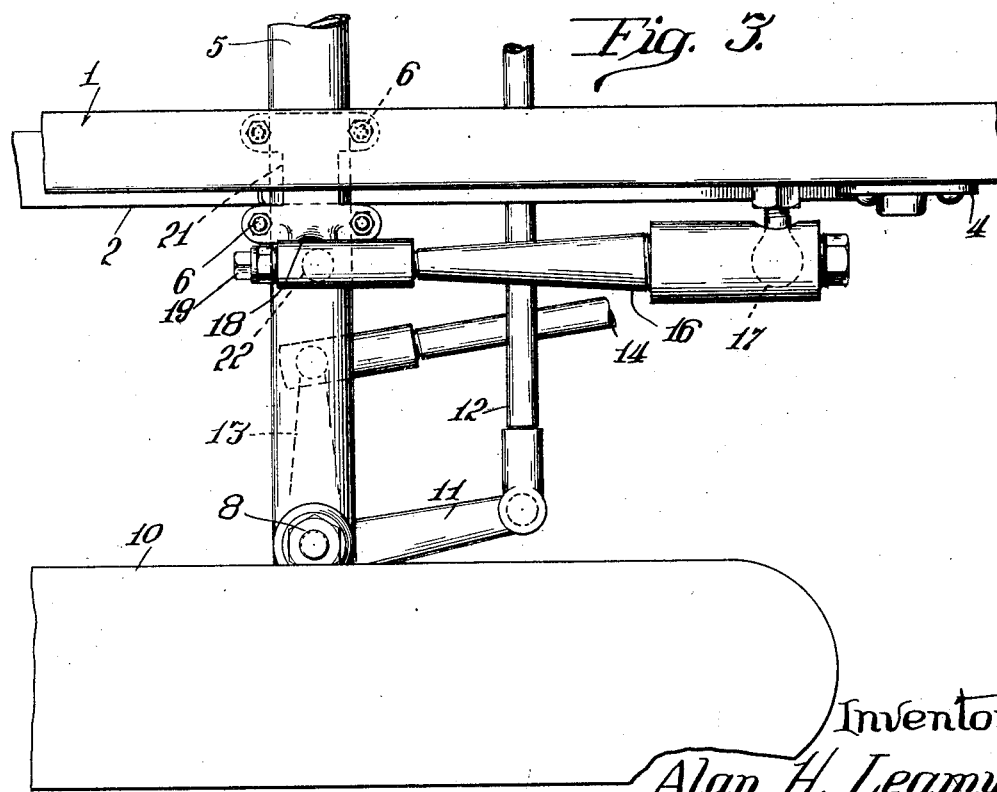
Inventor
Alan H. Leamy
By Arthur Wm Nelson
Attorney Patented Dec. 1, 1931

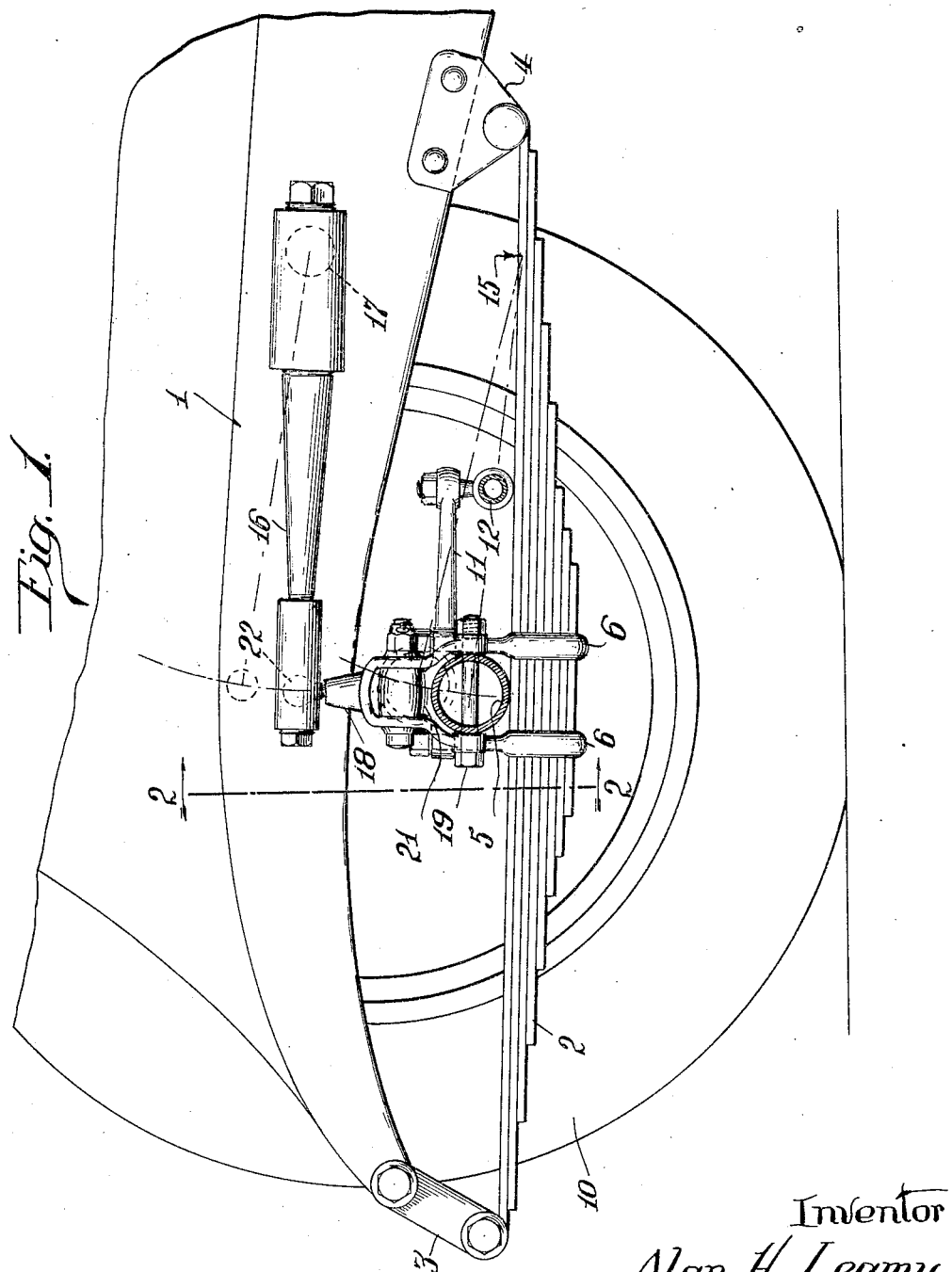

1,834,164

UNITED STATES PATENT OFFICE

ALAN H. LEAMY, OF AUBURN, INDIANA, ASSIGNOR TO MANNING & CO., OF CHICAGO, ILLINOIS, A CORPORATION OF ILLINOIS

AUTOMOBILE CONSTRUCTION

Application filed October 30, 1929. Serial No. 403,397.

This invention relates to improvements in automobile constructions and it consists of the matters hereinafter described and more particularly pointed out in the appended claims.

The present invention is particularly concerned with the front spring and axle and parts associated therewith, of an automobile. It is known that where a front spring flexes in use the theoretical axis of the flexing is located approximately at a point forward the rear end of the spring, so that the axle and all parts directly connected therewith travel in an arc described about said axis during such flexing. This arcuate travel of the axle throws the king pin or spindle of both front wheels, as well as all associated parts of the steering mechanism out of their normal plane, so that steering ease is disturbed and unnecessary wear is induced in said steering mechanism parts.

The primary object of the present invention is to provide a simple and efficient means which readily permits the flexing of the spring and coacts therewith to hold all parts in their normal plane during the flexing of the spring.

Another object of the invention is to provide a means which is operatively connected with the frame and front axle respectively and coacts with the spring to form a parallelogram arrangement, whereby said axle and the parts connected therewith are maintained in their normal plane during the flexing of the spring so that their actions are in no manner affected during such flexing of the spring.

These objects of the invention as well as others together with the many advantages thereof will more fully appear as I proceed with my specification.

In the drawings:—

Fig. 1 is a view in side elevation of the front end portion of an automobile embodying my improved construction.

Fig. 2 is a vertical sectional view through the same as taken on the line 2—2 of Fig. 1.

Fig. 3 is a view in top plan elevation of the parts shown in Fig. 1.

Referring now in detail to that embodiment of the invention illustrated in the accompanying drawings:—1 indicates as a whole the front end portion of the left hand member of an automobile frame and 2 indicates the usual front spring operatively connected thereto at its ends by the shackle links 3 and bracket 4 respectively. 5 indicates the transversely extending front axle of the automobile which as shown herein is tubular. The springs 2 are herein shown as underslung with respect to the axle and the mid portion of each spring is connected to said axle by the usual U-shaped clamps 6. Each end of the axle is bent upwardly and the extremity thereof is formed to receive an associated steering knuckle 7, which is pivoted thereto by the usual king pin 8. Said knuckle carries the spindle 9 to receive a front wheel 10. Both knuckles 7 include steering arms 11 that are connected together by a drag link 12 and the left hand knuckle also includes a knuckle thrust arm 13 to which is operatively connected the usual steering arm thrust rod 14. The rod 14 is of course connected to the usual steering mechanism operable as by the usual steering wheel which is not herein shown.

The foregoing description fairly exemplifies structure found in the modern automobile driven from the rear axle. Although such a construction has been substantially accepted as standard it has one serious disadvantage which is overcome by my improved construction. It is well known that when the conventional front spring flexes in use upon the road as when the front wheels engage bumps and depressions therein, the theoretical axis of flexation is located at a point a short distance in advance of the point attachment of the rear end of the spring. For convenience I have indicated this axis point by an arrow head in Fig. 1 which bears the reference numeral 15.

In the flexing of said springs, it is apparent that the axle and all parts such as the steering knuckle 7, together with the king pin 8 and parts whereby steering turning movement is imparted to the wheels, must travel in an arc described about the point 15 as an axis. Thus in such movement a change from the normal position is produced not only in the king pin but also in the various steering arms and the like which imparts shocks to the steering wheel and makes steering of the automobile harder and more tiresome whereby absolute control is lessened to that extent.

In connection with the structure, previously mentioned, I provide a rigid arm 16 disposed substantially parallel with and above the rear half of the spring and the rear end thereof is pivoted to the chassis frame member 1 as for example by a ball and socket joint 17 which is disposed in substantially the perpendicular plane of the axis point 15 as best shown in Fig. 1. To the axle 5 to the outside of the spring seat and clamp 6 I provide an upstanding bracket 18 which is rigidly secured to the axle. As shown herein said bracket straddles the axle 5 and is bolted at its bottom and to the axle as at 19 and is pinned at its midportion as at 20 to the plate 21 on the axle that receives the U-bolts 6.

The top end of said bracket is connected as by a ball and socket joint 22 to the front end of the arm 16 as best shown in Fig. 1. Thus the arm, secured to the frame and axle as mentioned coacts with that part of the spring between the axle 5 and point 15 to provide a parallelogram. When the spring is flexed as upon the front wheel or wheels engaging a bump or depression, the axle and parts associated therewith do not travel in an arc but do travel in or are confined to a substantially perpendicular plane so that all parts are maintained in their normal planes. With said parts thus maintained in their normal planes it is apparent that no quick short movements are imparted to the steering wheel, which movements have at times jerked the wheel from out of the driver's hands and have caused serious accidents.

By means of the ball joint connection for both ends of the arm 16 as mentioned lateral sway of the chassis with respect to the axle is permitted and there is no breakage of parts on this account. It is pointed out, of course, that such connections do not necessarily have to be of the ball joint type because any connection which will permit the sway mentioned will suffice. Ordinarily there will be one of such arms at each side of the automobile, but where conditions so permit, a single arm positioned midway between the springs will be operative.

The construction described is simple and has many advantages. It permits of an easier and better controlled steering and therefore reduces shimmying. It also reduces the transmission of road shocks to the steering wheel so that the fatigue developed in long runs is eliminated.

While in describing my invention, I have referred in detail to the form, arrangement and construction of parts forming one embodiment of said invention, the same is to be considered merely as illustrative of said embodiment so therefor I do not wish to be limited thereto except as may be specifically set forth in the appended claims.

I claim as my invention:—

1. An automobile construction embodying therein a frame member, a front axle, a spring connected at its mid portion to the axle and having oppositely extending end portions operatively connected to the frame, an upstanding arm fixed to the axle to one side of the mid portion of the spring, a rigid member associated with and of a length approximating that of the flexible part of one end portion of the spring operatively connected at one end to the top end of said arm and at its other end to said frame member and coacting with the flexible part of said spring portion to form a parrallelogram arrangement holding the axle against arcuate swinging movement in the flexing of the spring.

2. An automobile construction embodying therein a frame member, a front axle, a spring connected at its mid portion to the axle and having oppositely extending end portions operatively connected to the frame, an upstanding arm fixed to the axle to one side of the mid portion of the spring, means pivotally connecting one end of said rigid member with said arm, and means pivotally connecting the other end of said rigid member with said frame, said rigid member coacting with the flexible part of the spring to form a parallelogram arrangement holding said axle against arcuate swinging movement in the flexing of the spring, said two last mentioned means provided the pivotal connection for the rigid member being so formed as to accommodate a later movement between said spring and frame.

In testimony whereof, I have hereunto set my hand, this 26th day of October, 1929.

ALAN H. LEAMY.